United States Patent
Guo et al.

(10) Patent No.: US 10,334,604 B2
(45) Date of Patent: *Jun. 25, 2019

(54) DATA ROUTING METHOD AND DEVICE

(71) Applicant: HUAWEI TECHNOLOGIES CO., LTD., Shenzhen, Guangdong (CN)

(72) Inventors: Yali Guo, Shenzhen (CN); Wanqiang Zhang, Munich (DE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/823,960

(22) Filed: Nov. 28, 2017

(65) Prior Publication Data

US 2018/0084556 A1 Mar. 22, 2018

Related U.S. Application Data

(63) Continuation of application No. 15/044,409, filed on Feb. 16, 2016, now Pat. No. 9,854,587, which is a (Continued)

(51) Int. Cl.
*H04W 8/04* (2009.01)
*H04W 40/00* (2009.01)
(Continued)

(52) U.S. Cl.
CPC ......... *H04W 72/0493* (2013.01); *H04W 4/70* (2018.02); *H04W 8/02* (2013.01); *H04W 8/04* (2013.01); *H04W 8/06* (2013.01)

(58) Field of Classification Search
CPC ..... H04L 45/30; H04L 45/306; H04L 45/308; H04W 4/005; H04W 8/04; H04W 8/22; H04W 40/02; H04W 40/00
See application file for complete search history.

(56) References Cited

U.S. PATENT DOCUMENTS

| 9,554,296 B2 * | 1/2017 | Rao ...................... H04W 4/70 |
| 2014/0003313 A1 | 1/2014 | Jain et al. |

(Continued)

FOREIGN PATENT DOCUMENTS

| CN | 102547658 | 7/2012 |
| CN | 102868995 | 1/2013 |

(Continued)

OTHER PUBLICATIONS

"Change Request" SA WG2 Meeting #90, S2-121371, Apr. 16-20, 2012, Bratislava, Slovakia (9 pp.).

(Continued)

*Primary Examiner* — Scott M Sciacca
(74) *Attorney, Agent, or Firm* — Staas & Halsey LLP

(57) ABSTRACT

A data routing method includes: receiving, by a home subscriber server (HSS), a route distinguisher of a mobile management entity (MME) serving user equipment (UE) and an information transmission manner supported by the MME that are sent by the MME; receiving, by the HSS, a query message, wherein the query message carries a UE identifier and an information transmission manner that needs to be used; determining, by the HSS according to the information transmission manner supported by the MME, the UE identifier, and the information transmission manner that needs to be used, that the MME supports the information transmission manner that needs to be used; and sending, by the HSS, the route distinguisher of the MME to a data routing apparatus, so that the data routing apparatus routes, according to the route distinguisher, a data packet that needs to be transmitted.

6 Claims, 8 Drawing Sheets

Related U.S. Application Data continuation of application No. PCT/CN2013/081551, filed on Aug. 15, 2013.

(51) Int. Cl.
*H04W 72/04* (2009.01)
*H04W 8/06* (2009.01)
*H04W 8/02* (2009.01)
*H04W 4/70* (2018.01)

(56) References Cited

U.S. PATENT DOCUMENTS

| | | | |
|---|---|---|---|
| 2014/0134996 A1* | 5/2014 | Barclay | H04W 24/08 455/422.1 |
| 2014/0269779 A1 | 9/2014 | Shan et al. | |
| 2015/0172909 A1 | 6/2015 | Chandramouli et al. | |
| 2016/0286385 A1 | 9/2016 | Ryu et al. | |

FOREIGN PATENT DOCUMENTS

| | | |
|---|---|---|
| CN | 103079184 | 5/2013 |
| CN | 103179549 | 6/2013 |
| KR | 20010075927 | 8/2001 |
| KR | 20030034281 | 5/2003 |

OTHER PUBLICATIONS

"Change Request", 3GPP TSG-SA2 Meeting #91, S2-122620, May 21-25, 2012, Kyoto, Japan (6 pp.).

"MTC-IWF selection for Uplink small data", SA WG2 Meeting #96, S2-130990, Apr. 8-12, 2013, San Diego, California, USA (6 pp.).

International Search Report, dated May 19, 2014, in International Application No. PCT/CN2013/081551 (6 pp.).

Written Opinion of the International Searching Authority, dated May 19, 2014, in International Application No. PCT/CN2013/081551 (12 pp.).

Extended European Search Report, dated Jun. 21, 2016, in European Application No. 13981560.8 (9 pp.).

Search Report, dated Nov. 13, 2017, in Chinese Application No. 2013800023172 (2 pp.).

Office Action, dated Nov. 23, 2017, in Chinese Application No. 201380002317.2 (3 pp.).

Notice of Allowance, dated Aug. 17, 2017, in U.S. Appl. No. 15/044,409 (12 pp.).

U.S. Appl. No. 15/044,409, filed Feb. 16, 2016, Yali Guo et al., Huawei Technologies Co., Ltd.

* cited by examiner

US 10,334,604 B2

DATA ROUTING METHOD AND DEVICE

CROSS-REFERENCE TO RELATED APPLICATIONS

This application is a continuation of U.S. patent application Ser. No. 15/044,409, filed on Feb. 16, 2016, which is a continuation of International Application No. PCT/CN2013/081551, filed on Aug. 15, 2013. Both of the aforementioned applications are hereby incorporated by reference in their entireties.

TECHNICAL FIELD

Embodiments of the present application relate to communications technologies, and in particular, to a data routing signal processing method and device.

BACKGROUND

Application of machine type communication (MTC) refers to application, such as traffic control and management, remote meter reading, remote monitoring, mobile payment, locating and tracing, or medical monitoring of network communication performed by one network element or between multiple network elements in a case in which human participation is not required.

An application service platform (Machine Type Communications Server, MTC Server) sends a data packet (such as information reporting or information delivery with a data amount of only several bytes) with a small data amount to user equipment (UE) by using an established service interaction functional entity (Machine Type Communications-Interworking Function, MTC-IWF) and a mobile communications network. A specific transmission procedure is: The MTC-IWF obtains, from the MTC Server, a data packet that needs to be sent to the UE, selects a proper transmission path for the data packet according to a size of the data packet, and transmits the data packet to the UE by using a mobile network.

However, in actual network architecture deployment, information transmission manners supported by networks deployed by operators are not the same, and the MTC-IWF cannot accurately select a proper transmission path for a data packet, resulting in that the data packet cannot be transmitted to UE or transmission of the data packet to the UE is delayed, thereby affecting service experience of a user.

SUMMARY

The present application provides a data routing method and device, which are used to select a proper transmission path for data packet transmission.

According to a first aspect, a signal processing method is provided, including: receiving, by a home subscriber server HSS, a route distinguisher of a mobile management entity MME serving user equipment UE sent by the MME; determining, by the HSS according to the route distinguisher of the MME, an information transmission manner supported by the MME, where the route distinguisher is in a one-to-one correspondence with the information transmission manner supported by the MME; receiving, by the HSS, a query message sent by a service interaction functional entity MTC-IWF, where the query message carries a user equipment UE identifier and an information transmission manner that needs to be used; and determining, by the HSS according to the information transmission manner supported by the MME, the UE identifier, and the information transmission manner that needs to be used, that the MME serving the UE supports the information transmission manner that needs to be used; and
sending, by the HSS, a route distinguisher of the MME that corresponds to the information transmission manner that needs to be used to the MTC-IWF, so that the MTC-IWF performs routing according to the route distinguisher.

With reference to the first aspect, in a first possible implementation manner, the route distinguisher sent by the MME serving the user equipment UE and received by the HSS includes: all route distinguishers of the MME; or a route distinguisher of the MME that corresponds to an information transmission manner supported by both the MME and the UE.

With reference to the first aspect, in a second possible implementation manner, the determining, by the HSS according to the information transmission manner supported by the MME, the UE identifier, and the information transmission manner that needs to be used, that the MME supports the information transmission manner that needs to be used includes: determining, by the HSS according to the UE identifier, the MME serving the UE; and querying, according to the information transmission manner that needs to be used, the information transmission manner supported by the MME, to determine that the MME serving the UE supports the information transmission manner that needs to be used.

According to a second aspect, a data routing method is provided, including: receiving, by a home subscriber server HSS, a route distinguisher of a mobile management entity MME serving user equipment UE and an information transmission manner supported by the MME that are sent by the MME; receiving, by the HSS, a query message sent by a service interaction functional entity MTC-IWF, where the query message carries a user equipment UE identifier and an information transmission manner that needs to be used; determining, by the HSS according to the information transmission manner, the UE identifier, and the information transmission manner that needs to be used, that the MME serving the user equipment UE supports the information transmission manner that needs to be used; and sending, by the HSS, the route distinguisher of the MME to the MTC-IWF, so that the MTC-IWF routes, according to the route distinguisher, a data packet that needs to be transmitted.

With reference to the second aspect, in a first possible implementation manner, information about the information transmission manner sent by the MME and received by the HSS includes: information about an information transmission manner supported by both the MME and the UE.

With reference to the second aspect, in a second possible implementation manner, the determining, by the HSS according to the information transmission manner supported by the MME, the UE identifier, and the information transmission manner that needs to be used, that the MME supports the information transmission manner that needs to be used includes: determining, by the HSS according to the UE identifier, the MME serving the UE; and querying, according to the information transmission manner that needs to be used, the information transmission manner supported by the MME, to determine that the MME serving the UE supports the information transmission manner that needs to be used.

According to a third aspect, a data routing method is provided, including: receiving, by a service interaction functional entity MTC-IWF, a user equipment UE identifier, a data packet that needs to be transmitted, and an information transmission manner that needs to be used that are sent by an application service platform; sending, by the MTC-IWF, a query message to a home subscriber server HSS, where the query message carries the UE identifier and the information transmission manner that needs to be used, so that the HSS determines, according to the UE identifier and the information transmission manner that needs to be used, that an MME serving user equipment UE supports the information transmission manner that needs to be used; receiving, by the MTC-IWF, a route distinguisher of the MME sent by the HSS; and routing, by the MTC-IWF, the data packet according to the route distinguisher.

With reference to the third aspect, in a first possible implementation manner, the receiving, by the MTC-IWF, a route distinguisher of the MME sent by the HSS includes: receiving, by the MTC-IWF, a route distinguisher that corresponds to an information transmission manner supported by both the MME and the UE and that is sent by the HSS.

According to a fourth aspect, a data routing method is provided, including: receiving, by a mobile management entity MME, a request for registering with the MME sent by user equipment; and sending, by the MME, a route distinguisher of the MME to a home subscriber server HSS, where the route distinguisher is in a one-to-one correspondence with an information transmission manner supported by the MME, so that the HSS determines, according to the route distinguisher, the information transmission manner supported by the MME, determines, according to the information transmission manner supported by the MME, and a UE identifier and an information transmission manner that needs to be used that are sent by the MTC-IWF, that the MME supports the information transmission manner that needs to be used, and sends a route distinguisher that corresponds to the information transmission manner that needs to be used to the MTC-IWF, so that the MTC-IWF performs routing according to the route distinguisher.

With reference to the fourth aspect, in a first possible implementation manner, the receiving, by an MME, a request for registering with the MME sent by user equipment includes: receiving, by the MME, a request, for registering with the MME, that carries capability information of the user equipment and that is sent by the user equipment; determining, by the MME, a route distinguisher that corresponds to the information transmission manner that can be supported by the MME includes: determining, by the MME, a route distinguisher that corresponds to an information transmission manner that can be supported by both the MME and the UE; and the sending, by the MME, a route distinguisher to the home subscriber server HSS includes: sending, by the MME to the HSS, the route distinguisher that corresponds to the information transmission manner supported by both the MME and the UE.

With reference to the first possible implementation manner of the fourth aspect, in a second possible implementation manner, the receiving, by an MME, a request for registering with the MME sent by user equipment includes: receiving, by the MME, a non-access stratum (NAS) message sent by the user equipment; or receiving, by the MME, a location update request message sent by the user equipment; or receiving, by the MME, a switching request message sent by the user equipment.

According to a fifth aspect, a data routing method is provided, including: receiving, by a mobile management entity MME, a request for registering with the MME sent by user equipment; and sending, by the MME, a route distinguisher supported by the MME and an information transmission manner supported by the MME to a home subscriber server HSS, so that the HSS determines, according to the information transmission manner, and a UE identifier and an information transmission manner that needs to be used that are sent by a service interaction functional entity MTC-IWF, that the MME supports the information transmission manner that needs to be used, and sends the route distinguisher of the MME to the MTC-IWF, so that the MTC-IWF routes, according to the route distinguisher, a data packet that needs to be transmitted.

With reference to the fifth aspect, in a first possibly implemented manner, receiving, by the MME, an NAS message sent by the user equipment includes: receiving, by the MME, an NAS message that carries capability information of the user equipment and that is sent by the user equipment; determining, by the MME, a route distinguisher that corresponds to the information transmission manner that can be supported by the MME includes: determining, by the MME, a route distinguisher that corresponds to an information transmission manner that can be supported by both the MME and the UE; and the sending, by the MME, a route distinguisher to the home subscriber server HSS includes: sending, by the MME to the HSS, the route distinguisher that corresponds to the information transmission manner supported by both the MME and the UE.

According to a sixth aspect, a data routing apparatus is provided, including: a receiving module, configured to receive a route distinguisher of a mobile management entity MME serving user equipment UE sent by the MME, where the route distinguisher is in a one-to-one correspondence with an information transmission manner supported by the MME; a first determining module, configured to determine, according to the route distinguisher of the MME received by the receiving module, an information transmission manner supported by the MME, where the route distinguisher is in a one-to-one correspondence with the information transmission manner supported by the MME, where the receiving module is configured to receive a query message sent by a service interaction functional entity MTC-IWF, where the query message carries a user equipment UE identifier and an information transmission manner that needs to be used; a second determining module, configured to determine, according to the information transmission manner supported by the MME and determined by the first determining module, and the UE identifier and the information transmission manner that needs to be used that are received by the receiving module, that the MME serving the UE supports the information transmission manner that needs to be used; and a sending module, configured to send a route distinguisher of the MME that is received by the receiving module and that corresponds to the information transmission manner that needs to be used to the MTC-IWF, so that the MTC-IWF performs routing according to the route distinguisher.

With reference to the sixth aspect, in a first possibly implemented manner, the receiving module is specifically configured to receive a route distinguisher that corresponds to an information transmission manner supported by both the MME and the UE and sent by the MME.

With reference to the sixth aspect, in a second possible implementation manner, the second determining module is specifically configured to:

determine, according to the UE identifier received by the receiving module, the MME serving the UE, and query, according to the information transmission manner that needs to be used, the information transmission manner supported by the MME and determined by the first determining module, to determine that the MME serving the UE supports the information transmission manner that needs to be used.

According to a seventh aspect, a data routing apparatus is provided, including: a receiving module, configured to receive a route distinguisher of a mobile management entity MME serving user equipment UE and an information transmission manner supported by the MME that are sent by the MME, where the receiving module is configured to receive a query message sent by a service interaction functional entity MTC-IWF, where the query message carries a user equipment UE identifier and an information transmission manner that needs to be used; a determining module, configured to determine, according to the information transmission manner, the UE identifier, and the information transmission manner that needs to be used that are received by the receiving module, that the MME serving the user equipment UE supports the information transmission manner that needs to be used; and a sending module, configured to send the route distinguisher received by the receiving module to the MTC-IWF, so that the MTC-IWF routes, according to the route distinguisher, a data packet that needs to be transmitted.

With reference to the seventh aspect, in a first possible implementation manner, the receiving module is specifically configured to receive information about an information transmission manner supported by both the MME and the UE and sent by the MME.

With reference to the seventh aspect, in a second possible implementation manner, the determining module is specifically configured to determine, according to the UE identifier received by the receiving module, the MME serving the UE, and query, according to the information transmission manner that needs to be used and that is received by the receiving module, the information transmission manner supported by the MME, to determine that the MME serving the UE supports the information transmission manner that needs to be used.

According to an eighth aspect, a data routing apparatus is provided, including: a receiving module, configured to receive a user equipment UE identifier, a data packet that needs to be transmitted, and an information transmission manner that needs to be used that are sent by an application service platform; a sending module, configured to send a query message to a home subscriber server HSS, where the query message carries the UE identifier and the information transmission manner that needs to be used that are received by the receiving module, so that the HSS determines, according to the UE identifier and the information transmission manner that needs to be used, that an MME serving user equipment UE supports the information transmission manner that needs to be used; and a receiving module, configured to receive a route distinguisher of the MME sent by the HSS; and a processing module, configured to route the data packet according to the route distinguisher received by the receiving module.

With reference to the eighth aspect, in a first possibly implemented manner, the receiving module is specifically configured to receive a route distinguisher that corresponds to an information transmission manner supported by both the MME and the UE and that is sent by the HSS.

According to a ninth aspect, a data routing apparatus is provided, including: a receiving module, configured to receive a request for registering with an MME sent by user equipment; and a sending module, configured to send a route distinguisher of the MME to a home subscriber server HSS, where the route distinguisher is in a one-to-one correspondence with an information transmission manner supported by the MME, so that the HSS determines, according to the route distinguisher, the information transmission manner supported by the MME, determines, according to the information transmission manner supported by the MME, and a UE identifier and an information transmission manner that needs to be used that are sent by the MTC-IWF, that the MME supports the information transmission manner that needs to be used, and sends the route distinguisher that corresponds to the information transmission manner that needs to be used to the MTC-IWF, so that the MTC-IWF performs routing according to the route distinguisher.

With reference to the ninth aspect, in a first possible implementation manner, the receiving module is specifically configured to receive a request, for registering with the MME, that carries capability information of the user equipment and that is sent by the user equipment; and the sending module is specifically configured to send, to the HSS, a route distinguisher that corresponds to an information transmission manner supported by both the MME and the UE.

With reference to the ninth aspect, in a second possible implementation manner, the receiving module is specifically configured to receive a non-access stratum NAS message sent by user equipment; or receive a location update request message sent by the user equipment; or receive a switching request message sent by the user equipment.

According to a tenth aspect, a data routing apparatus is provided, including: a receiving module, configured to receive a request for registering with an MME sent by user equipment; and a sending module, configured to send a route distinguisher supported by the MME and an information transmission manner that can be supported by the MME to a home subscriber server HSS, so that the HSS determines, according to the information transmission manner, and a UE identifier and an information transmission manner that needs to be used that are sent by an MTC-IWF, that the MME supports the information transmission manner that needs to be used, and sends the route distinguisher of the MME to the MTC-IWF, so that the MTC-IWF routes, according to the route distinguisher, a data packet that needs to be transmitted.

With reference to the tenth aspect, in a first possibly implemented manner, the receiving module is specifically configured to receive an NAS message that carries capability information of the user equipment and that is sent by the user equipment; and the sending module is specifically configured to send, to the HSS, a route distinguisher that corresponds to an information transmission manner supported by both the MME and the UE.

An HSS receives a route distinguisher of a mobile management entity (MME) serving user equipment UE sent by the MME, the HS S determines, according to the route distinguisher of the MME, an information transmission manner supported by the MME, where the route distinguisher is in a one-to-one correspondence with the information transmission manner supported by the MME, and receives a query message sent by an MTC-IWF, where the query message carries a user equipment UE identifier and an information transmission manner that needs to be used, the HSS determines, according to the information transmission manner supported by the MME, the UE identifier, and the information transmission manner that needs to be used, that the MME serving the UE supports the information transmission manner that needs to be used, and the HSS sends the route distinguisher of the MME to the MTC-IWF, so that the MTC-IWF routes, according to the route distinguisher, a data packet that needs to be transmitted. Therefore, a most effective transmission path is selected for information transmission, thereby improving service experience of a user.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

To make the objectives, technical solutions, and advantages of the present application clearer, the following further describes the present application in detail with reference to the accompanying drawings. Apparently, the described embodiments are merely some but not all of the embodiments of the present application. All other embodiments obtained by a person of ordinary skill in the art based on the embodiments of the present application without creative efforts shall fall within the protection scope of the present application.

In the embodiments of the present application, a data packet that is with a small data amount and that is transmitted in an LTE system is used as an example. For transmission of information in a small data format in another mobile communications network, as long as a method of routing in an information transmission manner in the present application is used, the transmission falls within the protection scope of the present application.

It should be specially noted that, in the embodiments of the present application, the data packet with the small data amount is described by using reporting or delivery of information with a data amount of only several bytes as an example. However, the protection scope of the present application includes but is not limited to this.

Figure 1:
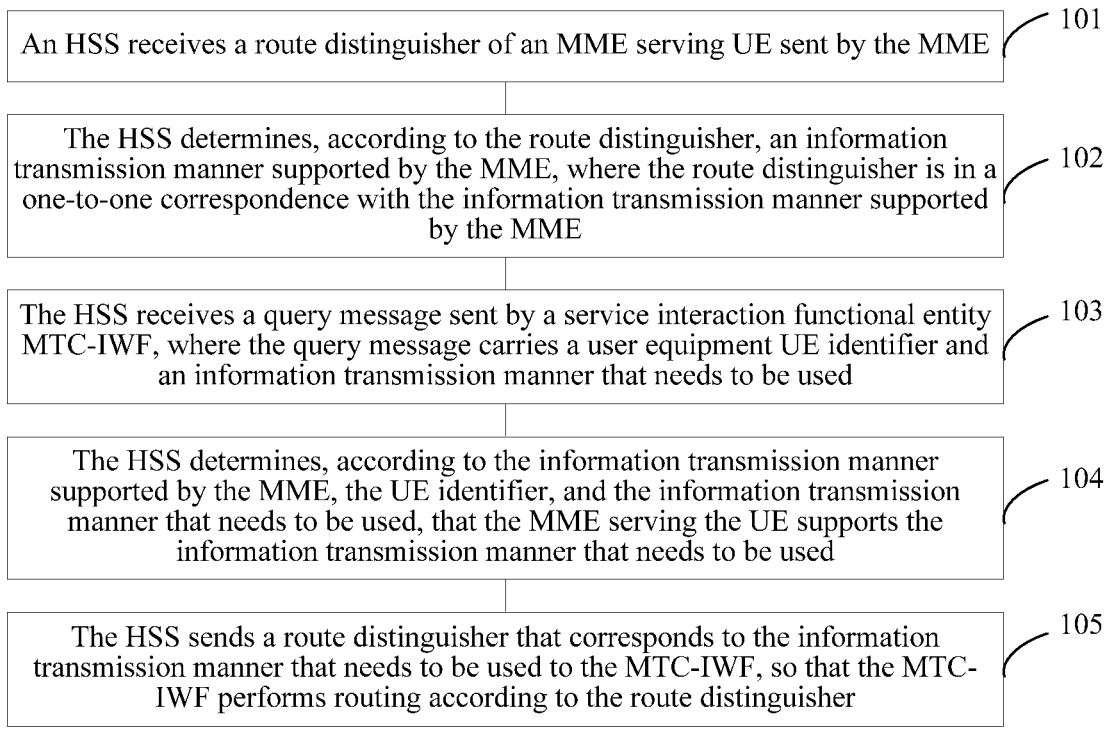
FIG. 1 is a schematic flowchart of an embodiment of a data routing method according to the present application.

FIG. 1 is a flowchart of an embodiment of a data routing method according to the present application. The embodiment includes:

101: An HSS receives a route distinguisher of an MME serving UE sent by the MME.

102: The HSS determines, according to the route distinguisher of the MME, an information transmission manner supported by the MME, where the route distinguisher of the MME is in a one-to-one correspondence with the information transmission manner supported by the MME.

The route distinguisher sent by the MME serving the UE and received by the HSS includes: all route distinguishers of the MME; or a route distinguisher of the MME that corresponds to an information transmission manner supported by both the MME and the UE.

103: The HSS receives a query message sent by an MTC-IWF, where the query message carries a UE identifier and an information transmission manner that needs to be used.

104: The HSS determines, according to the information transmission manner supported by the MME, the UE identifier, and the information transmission manner that needs to be used, that the MME serving the UE supports the information transmission manner that needs to be used.

Step 104 specifically includes: determining, by the HSS according to the UE identifier, the MME serving the UE; and querying, according to the information transmission manner that needs to be used, the information transmission manner supported by the MME, to determine that the MME serving the UE supports the information transmission manner that needs to be used.

105: The HSS sends a route distinguisher of the MME that corresponds to the information transmission manner that needs to be used to the MTC-IWF, so that the MTC-IWF performs routing according to the route distinguisher of the MME.

In this embodiment of the present application, an HSS receives a route distinguisher of an MME serving UE sent by the MME, determines, according to the route distinguisher of the MME, an information transmission manner supported by the MME, and determines, according to the information transmission manner supported by the MME, a received UE identifier, and an information transmission manner that needs to be used, that the MME serving the UE supports the information transmission manner that needs to be used, and the HSS sends a route distinguisher of the MME that corresponds to the information transmission manner that needs to be used to an MTC-IWF, so that the MTC-IWF routes, according to the route distinguisher of the MME, a data packet that needs to be transmitted. Therefore, a most effective transmission path is selected for information transmission, thereby improving service experience of a user.

Figure 2:
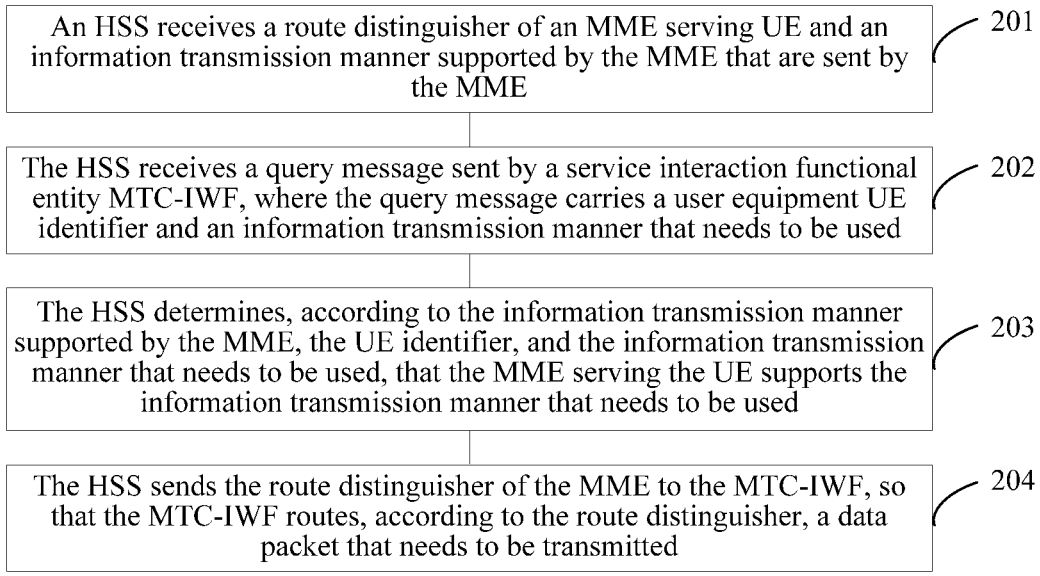
FIG. 2 is a schematic flowchart of another embodiment of a data routing method according to the present application.

FIG. 2 is a schematic flowchart of another embodiment of a data routing method according to the present application. The embodiment includes:

201: An HSS receives a route distinguisher of an MME serving UE and an information transmission manner supported by the MME that are sent by the MME.

The information transmission manner sent by the MME and received by the HSS may be an information transmission manner supported by the MME, or may be information about an information transmission manner supported by both the MME and the UE.

202: The HSS receives a query message sent by an MTC-IWF, where the query message carries a UE identifier and an information transmission manner that needs to be used.

203: The HSS determines, according to the information transmission manner supported by the MME, the UE identifier, and the information transmission manner that needs to be used, that the MME supports the information transmission manner that needs to be used.

Step 203 specifically includes: determining, by the HSS according to the UE identifier, the MME serving the UE; and querying, according to the information transmission manner that needs to be used, the information transmission manner supported by the MME, to determine that the MME serving the UE supports the information transmission manner that needs to be used.

204: The HSS sends the route distinguisher of the MME to the MTC-IWF, so that the MTC-IWF routes, according to the route distinguisher, a data packet that needs to be transmitted.

In this embodiment of the present application, an HSS receives a route distinguisher of an MME serving UE and an information transmission manner supported by the MME that are sent by the MME, and determines, according to the information transmission manner supported by the MME, the received UE identifier, and the information transmission manner that needs to be used, that the MME serving the UE supports the information transmission manner that needs to be used, and the HSS sends a route distinguisher of the MME that corresponds to the information transmission manner that needs to be used to an MTC-IWF, so that the MTC-IWF routes, according to the route distinguisher of the MME, a data packet that needs to be transmitted. Therefore, a most effective transmission path is selected for information transmission; and because a same route distinguisher is used, a success rate of sending a short message service message is further increased, thereby improving service experience of a user.

Figure 3:
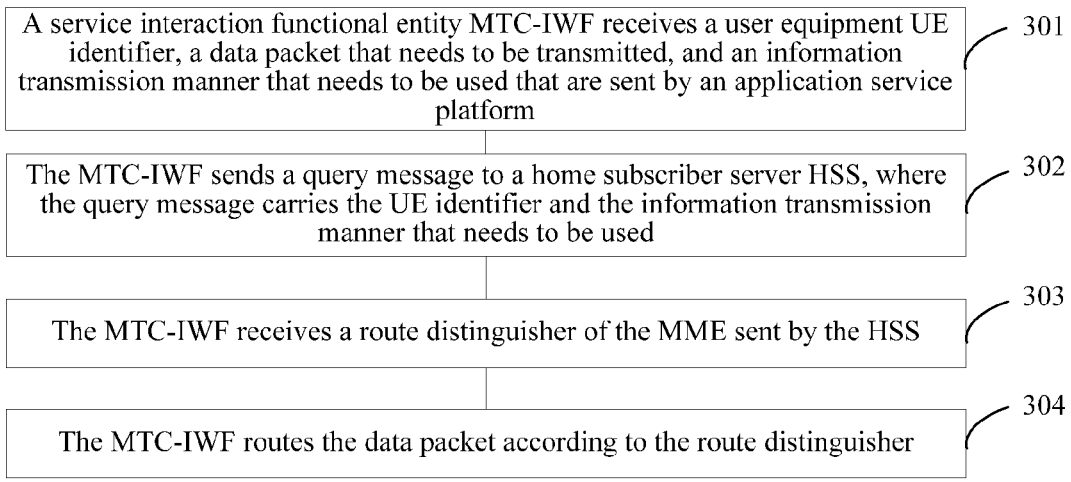
FIG. 3 is a schematic flowchart of another embodiment of a data routing method according to the present application.

FIG. 3 is a schematic flowchart of another embodiment of a data routing method according to the present application. The embodiment includes:

301: An MTC-IWF receives a UE identifier, a data packet that needs to be transmitted, and an information transmission manner that needs to be used that are sent by an MTC Server.

302: The MTC-IWF sends a query message to an HSS, where the query message carries the UE identifier and the information transmission manner that needs to be used, so that the HSS determines, according to an information transmission manner supported by an MME serving UE, the UE identifier, and the information transmission manner that needs to be used, that the MME supports the information transmission manner that needs to be used.

303: The MTC-IWF receives a route distinguisher of the MME that corresponds to the information transmission manner that needs to be used and that is sent by the HSS.

Optionally, step 303 may further be: the MTC-IWF may further receive a route distinguisher of the MME that corresponds to an information transmission manner supported by both the MME and the UE and needing to be used and that is sent by the HSS.

304: The MTC-IWF routes the data packet according to the route distinguisher of the MME.

In this embodiment of the present application, an MTC-IWF acquires a route distinguisher of an MME, and routes, according to the route distinguisher of the MME, a data packet that needs to be transmitted, so that the MTC-IWF accurately selects a proper transmission path for the data packet, to enable the data packet to arrive at UE in time, thereby improving service experience of a user.

Figure 4:
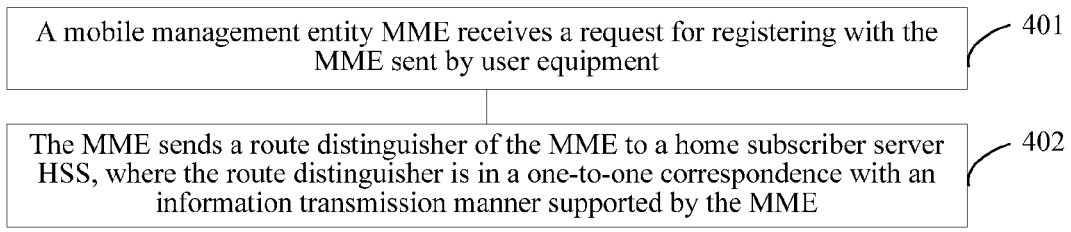
FIG. 4 is a schematic flowchart of another embodiment of a data routing method according to the present application.

FIG. 4 is a schematic flowchart of another embodiment of a data routing method according to the present application. The embodiment includes:

401: An MME receives a request for registering with the MME sent by UE.

Optionally, step 401 may further be: receiving, by the MME, a request, for registering with the MME, that carries capability information of the UE and that is sent by the UE.

The receiving, by an MME, a request for registering with the MME sent by UE includes: receiving, by the MME, a non-access stratum NAS message sent by the UE; or receiving, by the MME, a location update request message sent by the UE; or receiving, by the MME, a switching request message sent by the UE.

402: The MME sends a route distinguisher of the MME to an HSS, where the route distinguisher is in a one-to-one correspondence with an information transmission manner supported by the MME, so that the HSS determines, according to the route distinguisher of the MME, the information transmission manner supported by the MME, determines, according to the information transmission manner supported by the MME, and a UE identifier and an information transmission manner that needs to be used that are sent by the MTC-IWF, that the MME supports the information transmission manner that needs to be used, and sends a route distinguisher that corresponds to the information transmission manner that needs to be used to the MTC-IWF, so that the MTC-IWF performs routing according to the route distinguisher.

Optionally, step 402 may further be: sending, by the MME to the HSS, a route distinguisher that corresponds to an information transmission manner supported by both the MME and the UE.

In this embodiment of the present application, the MME determines a route distinguisher that corresponds to an information transmission manner that can be supported by the MME, and the MME sends the route distinguisher of the MME to an HSS, where the route distinguisher of the MME is in a one-to-one correspondence with the information transmission manner supported by the MME, so that the MTC-IWF routes, according to the route distinguisher of the MME, a data packet that needs to be transmitted. Therefore, a most effective transmission path is selected for information transmission, thereby improving service experience of a user.

Figure 5:
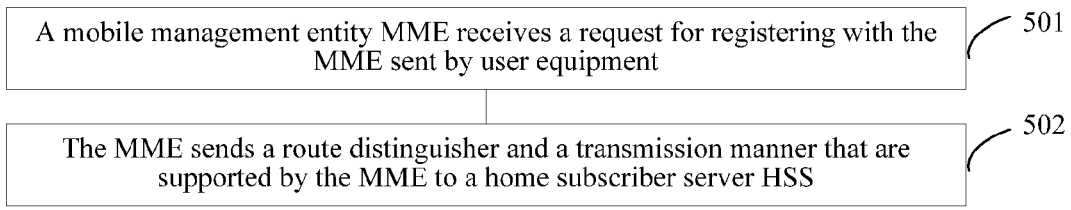
FIG. 5 is a schematic flowchart of another embodiment of a data routing method according to the present application.

FIG. 5 is a schematic flowchart of another embodiment of a data routing method according to the present application. The embodiment includes:

501: An MME receives a request for registering with the MME sent by UE.

502: The MME sends a route distinguisher supported by the MME and an information transmission manner supported by the MME to a home subscriber server HSS, so that the HSS determines, according to the information transmission manner supported by the MME, and a UE identifier and an information transmission manner that needs to be used that are sent by an MTC-IWF, that the MME supports the information transmission manner that needs to be used, and sends the route distinguisher of the MME to the MTC-IWF, so that the MTC-IWF routes, according to the route distinguisher, a data packet that needs to be transmitted.

Optionally, step 501 may further be: receiving, by the MME, an NAS message that carries capability information of the UE and that is sent by the UE; step 502 may further be: determining, by the MME, a route distinguisher that corresponds to an information transmission manner that can be supported by both the MME and the UE; and step 503 may further be: sending, by the MME to the HSS, the route distinguisher that corresponds to the information transmission manner supported by both the MME and the UE.

In this embodiment of the present application, a route distinguisher of the MME is sent to an HSS by using an information transmission manner that can be supported by the MME and the route distinguisher of the MME, so that an MTC-IWF routes, according to the route distinguisher of the MME, a data packet that needs to be transmitted. Therefore, the MTC-IWF accurately selects a proper transmission path for the data packet, so that the data packet can arrive at UE in time; and because a same route distinguisher is used, a distinguisher resource of a network node is reduced, thereby improving service experience of a user.

Figure 6:
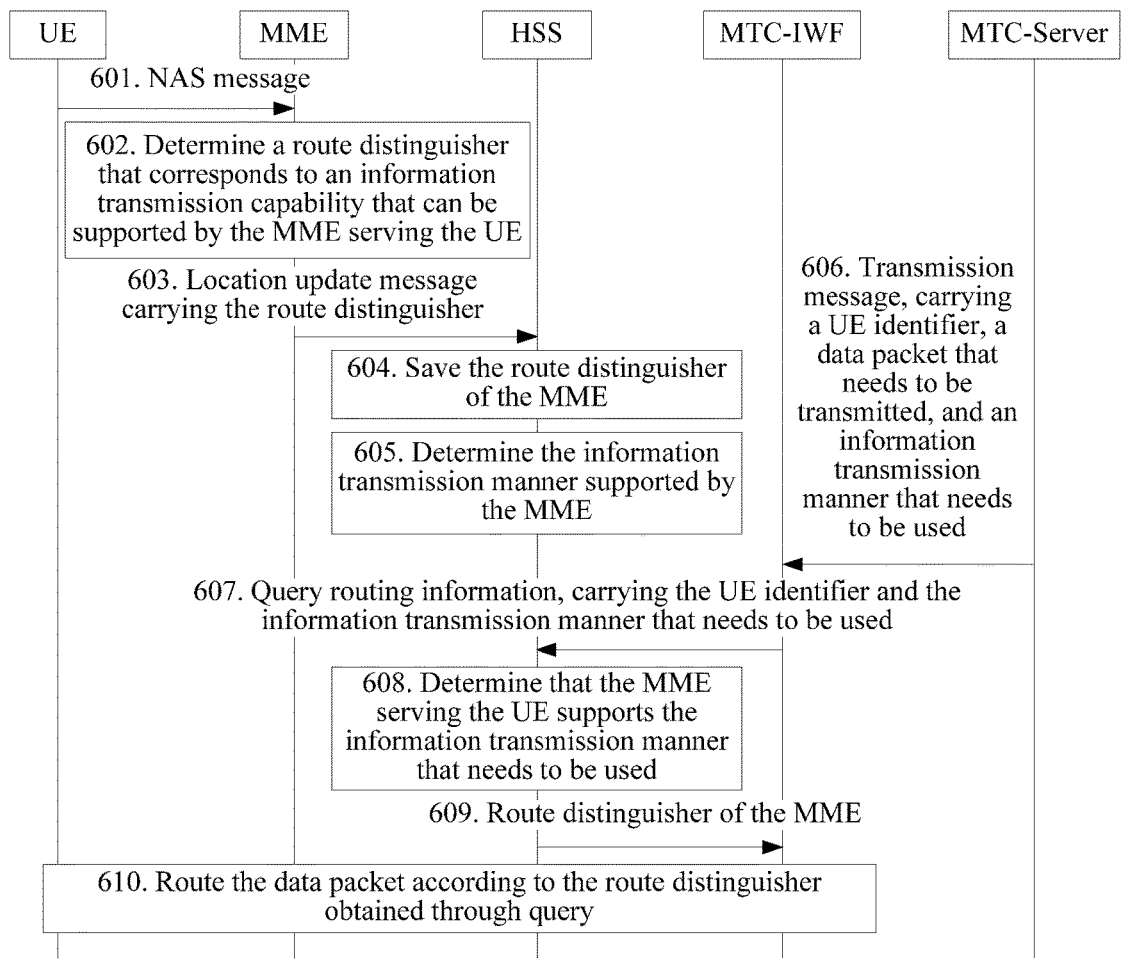
FIG. 6 is a schematic flowchart of another embodiment of a data routing method according to the present application.

FIG. 6 is a schematic flowchart of an embodiment of a data routing method according to the present application. The embodiment includes:

601: UE sends a non-access stratum (NAS) message to an MME serving the UE, and registers with the MME.

In addition to registering with the MME by means of a network attachment procedure, the UE may also register with the MME by means of a location update procedure or a switching procedure. The foregoing descriptions are all examples provided in the present application, and fall within the protection scope of the present application as long as the UE can register with the MME.

602: The MME serving the UE determines a route distinguisher that corresponds to an information transmission manner that can be supported by the MME.

The MME serving the UE sets different route distinguishers that correspond to information transmission manners supported by the MME, as shown in Table 1:

Table 1 provides examples of the information transmission manners supported by the MME and the route distinguishers, only for understanding of the present application. The present application includes but is not limited to the examples provided in Table 1.

603: The MME serving the UE sends a location update request message to an HSS, where the request message carries the route distinguisher of the MME, and the route distinguisher is in a one-to-one correspondence with the information transmission manner supported by the MME.

The route distinguisher of the MME may be: all route distinguishers of the MME, or a route distinguisher of the MME that corresponds to an information transmission manner supported by both the MME and the UE.

604: The HSS saves the route distinguisher of the MME to a context of the UE.

For example, if the MME determines that the MME supports the transmission of a short message service message, the HSS saves, to the context of the UE, the first-type MME ID received in step 603.

605: The HSS determines, according to the route distinguisher of the MME, the information transmission manner supported by the MME, where the route distinguisher of the MME is in a one-to-one correspondence with the information transmission manner supported by the MME.

For example, a correspondence between the route distinguisher of the MME and the information transmission manner supported by the MME may be pre-stored on the HSS, and therefore, the HSS determines, according to the route distinguisher of the MME, the information transmission manner supported by the MME.

606: An MTC server sends a transmission message, for example, a data sending request message, to an MTC-IWF, where the transmission message carries a UE identifier, a data packet that needs to be transmitted, and an information transmission manner that needs to be used.

607: The MTC-IWF sends a query message to the HSS, where the query message carries the UE identifier and the information transmission manner that needs to be used.

608: The HSS determines, according to the information transmission manner supported by the MME, the UE identifier, and the information transmission manner that needs to be used, that the MME serving the UE supports the information transmission manner that needs to be used.

For example, the HSS determines, according to the UE identifier, the MME serving the UE; and the HSS queries, according to the information transmission manner that needs to be used, the information transmission manner supported by the MME, to determine that the MME serving the UE supports the information transmission manner that needs to be used.

609: The HSS sends, to the MTC-IWF, a route distinguisher of the MME that corresponds to the information transmission manner that needs to be used.

TABLE 1

| Information transmission manner supported by an MME | Route distinguisher |
|---|---|
| A manner in which transmission of a short message service message is supported | First-type MME ID |
| A manner in which a service interaction functional entity directly performs control plane data transmission from the MME to the UE | Second-type MME ID |
| A manner in which transmission of a short message service message is supported, and a manner in which a service interaction functional entity directly performs control plane data transmission from the MME to the UE | First-type MME ID and second-type MME ID |

For example, in step 606 to step 609, the information transmission manner that needs to be used and that is acquired by the MTC-IWF from the MTC Server is an information transmission manner in which the MTC-IWF performs control plane data transmission from the MME serving the UE to the UE; and then the MTC-IWF sends the UE identifier and the information transmission manner that needs to be used to the HSS, and the HSS determines, according to the information transmission manner supported by the MME, the UE identifier, and the information transmission manner that needs to be used, whether the MME supports the information transmission manner that needs to be used. If the MME supports the information transmission manner that needs to be used, the HSS sends the second-type MME ID to the MTC-IWF; optionally, if the MME does not support the information transmission manner that needs to be used, a message sent by the HSS to the MTC-IWF does not carry a route distinguisher. This manner is only an example provided in the present application, and the present application includes but is not limited to this.

610: The MTC-IWF routes the data packet according to the route distinguisher of the MME obtained through query.

For example, if the route distinguisher is the second-type MME ID, the MTC-IWF adds the data packet to a control message between the MTC-IWF and the MME and sends the control message to the MME serving the UE, and the MME serving the UE sends the data packet to the UE by using an NAS message; or if the route distinguisher is the first-type MME ID, the MTC-IWF sends the data packet and the first-type MME ID to a short message service center, and the short message service center sends the data packet and the first-type MME ID to the UE by using the MME.

Optionally, if the MME with which the UE currently registers does not support the information transmission manner that needs to be used, the MTC-IWF cannot obtain routing information from the HSS, the MTC-IWF sends a data sending request failure message to the MTC-server, and the MTC Server may decide, according to a policy of the MTC Server, whether to discard the data packet or select another information transmission manner to perform retransmission.

In this embodiment of the present application, an HSS receives a route distinguisher of an MME serving UE sent by the MME, determines, according to the route distinguisher, an information transmission manner supported by the MME, and determines, according to the information transmission manner supported by the MME, a received UE identifier, and an information transmission manner that needs to be used, that the MME supports the information transmission manner that needs to be used, and the HSS sends a route distinguisher that corresponds to the information transmission manner that needs to be used to an MTC-IWF, so that the MTC-IWF routes, according to the route distinguisher, a data packet that needs to be transmitted. Therefore, a most effective transmission path is selected for information transmission, thereby improving service experience of a user.

Figure 7:
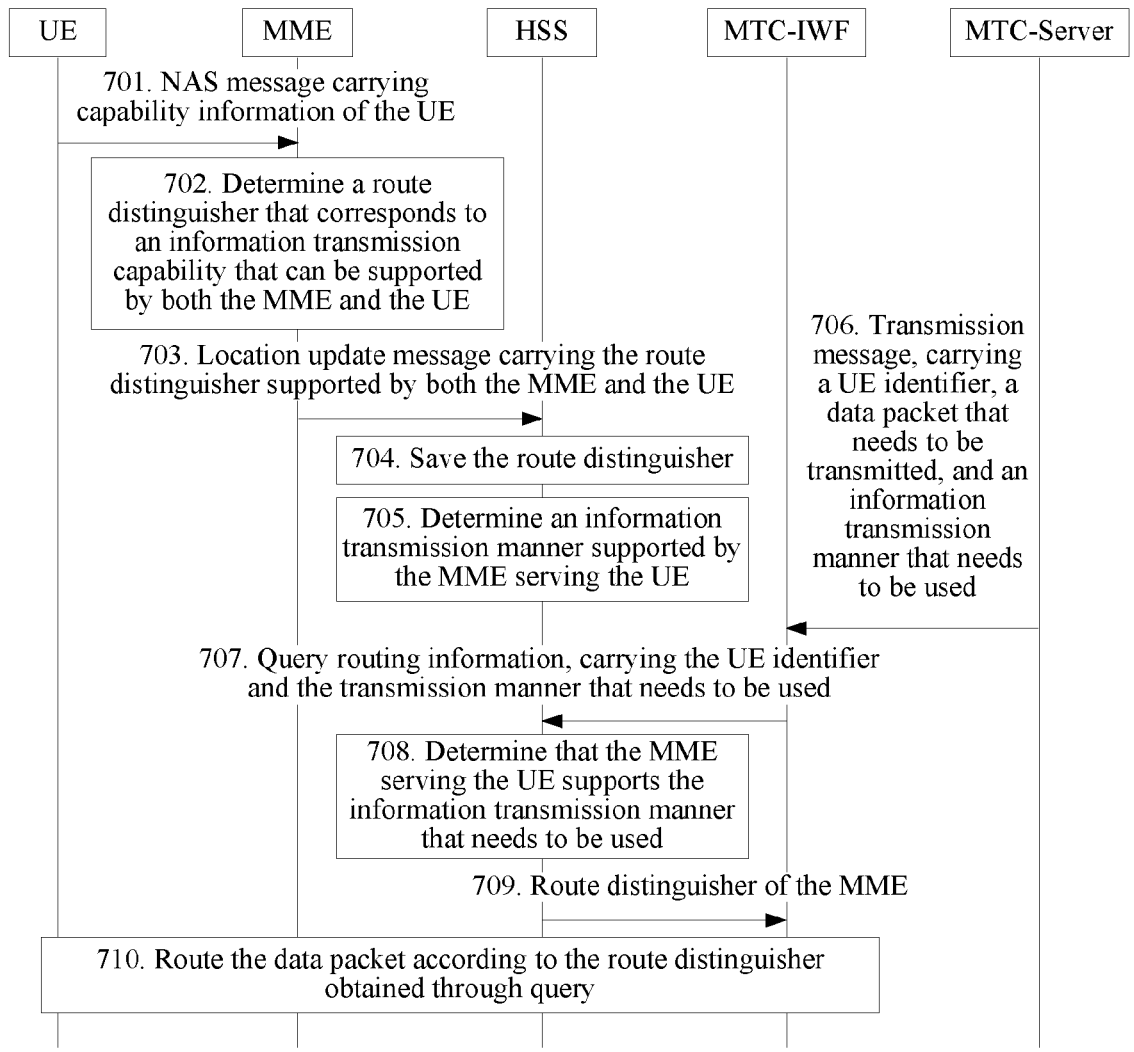
FIG. 7 is a schematic flowchart of another embodiment of a data routing method according to the present application.

FIG. 7 is a schematic flowchart of another embodiment of a data routing method according to the present application. The embodiment is similar to the embodiment shown in FIG. 6, and differences lie in:

701: UE sends an NAS message to an MME serving the UE, and registers with the MME, where the NAS message carries capability information of the UE.

The capability information of the UE may include a manner in which the UE supports transmission of a short message service message, or a manner in which the UE supports transmission, by using an NAS message, of a small data packet from the MME to the UE.

702: The MME serving the UE determines a route distinguisher that corresponds to an information transmission manner that can be supported by both the MME and the UE.

The MME serving the UE and the UE set different route distinguishers that correspond to information transmission manners supported by the MME and the UE, as shown in Table 2:

TABLE 2

| Information transmission manner supported by UE | Information transmission manner supported by an MME | Route distinguisher |
|---|---|---|
| A manner in which transmission of a short message service message is supported | A manner in which transmission of a short message service message is supported | First-type MME ID |
| A manner in which a service interaction functional entity directly performs control plane data transmission from the MME to the UE | A manner in which a service interaction functional entity directly performs control plane data transmission from the MME to the UE | Second-type MME ID |
| A manner in which transmission of a short message service message is supported, and a manner in which a service interaction functional entity directly performs control plane data transmission from the MME to the UE | A manner in which transmission of a short message service message is supported, and a manner in which a service interaction functional entity directly performs control plane data transmission from the MME to the UE | First-type MME ID and second-type MME ID |

Table 2 provides examples of the information transmission manners supported by the MME and the route distinguishers, only for understanding of the present application. The present application includes but is not limited to the examples provided in Table 2.

Because capabilities of terminals of different versions are different, a success rate of sending a short message service message is further increased in a manner in which the route distinguisher that corresponds to the information transmission manner that can be supported by both the UE and the MME serving the UE is used.

703: The MME serving the UE sends a location update request message to an HSS, where the request message carries the route distinguisher that is determined by the MME serving the UE and that corresponds to the information transmission manner that can be supported by both the MME and the UE.

704: The HSS saves, to a context of the UE, the route distinguisher that is determined by the MME serving the UE and the UE and that corresponds to the information transmission manner that can be supported by the MME and the UE.

For example, if the MME serving the UE determines that both the MME and the UE support a manner in which a short message service message is transmitted, the HSS saves, to the context of the UE, a corresponding first-type MME ID that supports the manner in which a short message service message is transmitted.

705: The HSS determines, according to the route distinguisher, an information transmission manner supported by the MME serving the UE.

706: The MTC Server sends a transmission message, for example, a data sending request message, to the MTC-IWF, where the transmission message carries a UE identifier, a data packet that needs to be transmitted, and an information transmission manner that needs to be used.

707: The MTC-IWF sends query routing information to the HSS, where the information carries the UE identifier and the transmission manner that needs to be used.

708: The HSS determines, according to the information transmission manner supported by the MME serving the UE, the UE identifier, and the information transmission manner that needs to be used, that the MME supports the information transmission manner that needs to be used.

709: The HSS sends, to the MTC-IWF, a route distinguisher of the MME that corresponds to the information transmission manner that needs to be used.

For example, in step 706 to step 709, the information transmission manner that needs to be used and that is acquired by the MTC-IWF from the MTC Server is an information transmission manner in which the MTC-IWF directly performs control plane data transmission from the MME serving the UE to the UE; and then the MTC-IWF sends the UE identifier and the information transmission manner that needs to be used to the HSS, and the HSS determines, according to the UE identifier, the information transmission manner that needs to be used, and the information transmission manner supported by the MME, whether the MME supports the information transmission manner that needs to be used. If the MME supports the information transmission manner that needs to be used, the HSS sends the second-type MME ID to the MTC-IWF.

710: The MTC-IWF routes the data packet according to the route distinguisher of the MME obtained through query.

For example, if the routing information is the second-type MME ID, the MTC-IWF adds the data packet to a control message between the MTC-IWF and the MME and sends the control message to the MME serving the UE, and the MME serving the UE sends the data packet to the UE by using an NAS message; or if the MME ID is the first-type MME ID, the MTC-IWF sends the data packet and the first-type MME ID to a short message service center, and the short message service center sends the data packet and the first-type MME ID to the UE by using the MME.

Optionally, if the MME with which the UE currently registers does not support the transmission manner that needs to be used, the MTC-IWF cannot obtain routing information from the HSS, the MTC-IWF sends a data sending request failure message to the MTC-server, and the MTC-server may decide, according to a policy of the MTC-server, whether to discard the data packet or select another transmission manner to perform retransmission.

The UE identifier mentioned above may be at least one of or a combination of the following: an international mobile subscriber identity (IMSI), a mobile station international ISDN number (MSISDN), and an external service identifier. The present application includes but is not limited to this.

In this embodiment of the present application, an HSS receives a route distinguisher of an MME sent by the MME, determines, according to the route distinguisher of the MME, a transmission manner supported by the MME, and determines, according to the transmission manner supported by the MME, a received UE identifier, and a transmission manner that needs to be used, that the MME supports the transmission manner that needs to be used, and the HSS sends a route distinguisher of the MME that corresponds to the information transmission manner that needs to be used to an MTC-IWF, so that the MTC-IWF routes, according to the route distinguisher of the MME, a data packet that needs to be transmitted. Therefore, a most effective transmission path is selected for information transmission, thereby improving service experience of a user.

Figure 8:
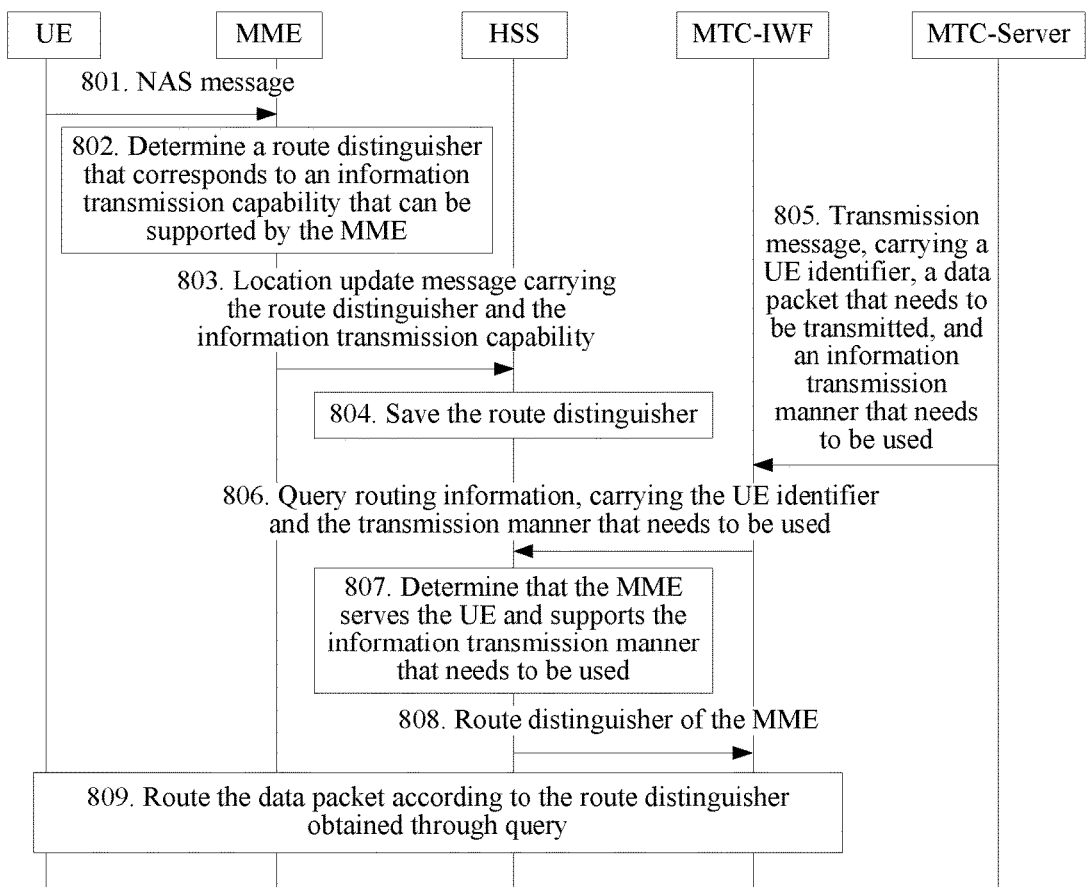
FIG. 8 is a schematic flowchart of another embodiment of a data routing method according to the present application.

FIG. 8 is a schematic flowchart of another embodiment of a data routing method according to the present application. Step 801 and step 805 to step 809 in the embodiment are similar to step 601 and step 605 to step 609 in the embodiment shown in FIG. 6, and differences lie in:

802: The MME serving the UE determines an information transmission manner that can be supported by the MME.

As shown in Table 3, different information transmission manners supported by the MME correspond to a same route distinguisher:

TABLE 3

| Information transmission manner supported by an MME | Route distinguisher |
|---|---|
| A manner in which transmission of a short message service message is supported | MME ID |
| A manner in which a service interaction functional entity directly performs control plane data transmission from the MME to the UE | MME ID |
| A manner in which transmission of a short message service message is supported, and a manner in which a service interaction functional entity directly performs control plane data transmission from the MME to the UE | MME ID |

Table 3 provides examples of the information transmission manners supported by the UE, the information transmission manners supported by the MME, and the route distinguisher, only for understanding of the present application. The present application includes but is not limited to the examples provided in Table 3.

803: The MME sends a location update request message to an HSS, where the request message carries the information transmission manner of the MME and a route distinguisher of the MME that corresponds to the information transmission manner.

For example, the route distinguisher of the MME is the MME ID in the foregoing table.

804: The HSS saves, to a context of the UE, the route distinguisher corresponding to the information transmission manner that is determined and supported by the MME.

For example, if the MME determines that the MME supports a manner in which a short message service message is transmitted, the HSS registers the manner supporting the short message service message and the MME ID in the context of the UE saved by the HSS.

In this embodiment of the present application, an MTC-IWF acquires a route distinguisher of an MME that currently serves the user and supports the information transmission manner, and the MTC-IWF routes, according to the route distinguisher of the MME, a data packet that needs to be transmitted, so that the MTC-IWF accurately selects a proper transmission path for the data packet, to enable the data packet to arrive at UE in time; and because a same route distinguisher is used, a distinguisher resource of a network node is reduced, thereby improving service experience of a user.

Figure 9:
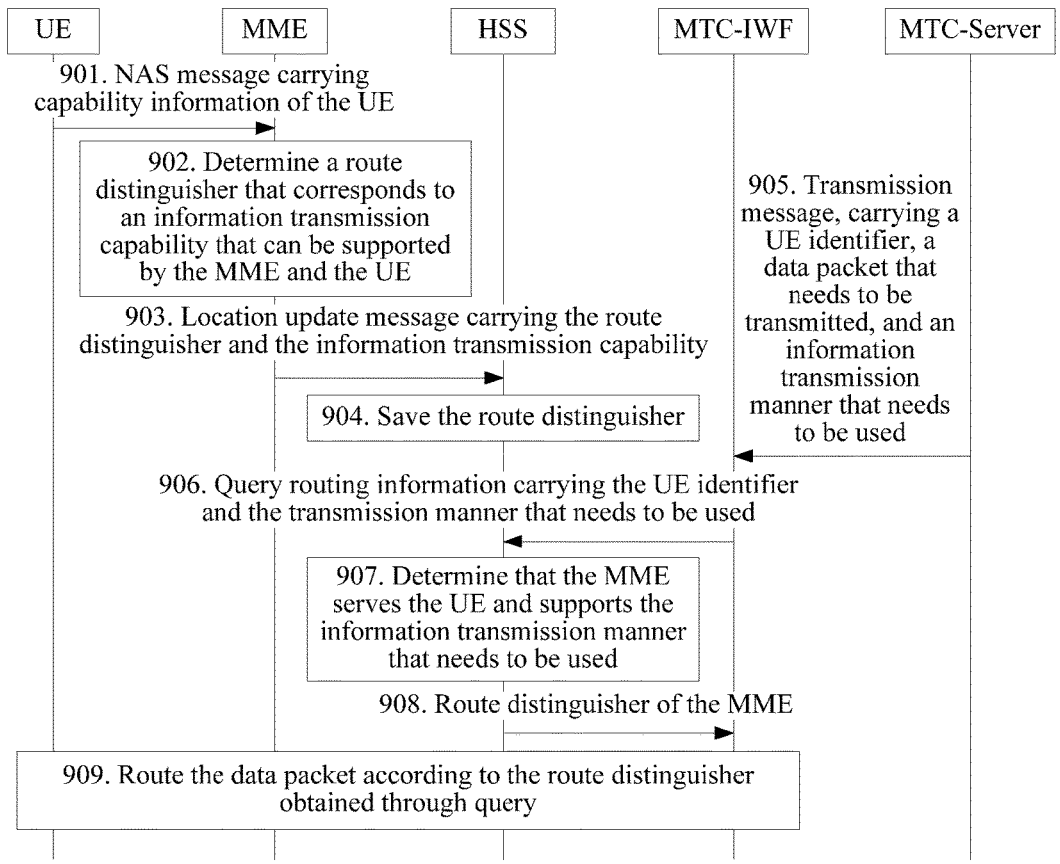
FIG. 9 is a schematic flowchart of another embodiment of a data routing method according to the present application.

FIG. 9 is a schematic flowchart of another embodiment of a data routing method according to the present application. The embodiment is similar to the embodiment shown in FIG. 8, and differences lie in:

901: UE sends an NAS message to an MME serving the UE, and registers with the MME, where the NAS message carries capability information of the UE.

The capability information of the UE may include a manner in which the UE supports information transmission of a short message service message, or a manner in which the UE supports transmission, by using an NAS message, of a small data packet from the MME to the UE.

902: The MME determines an information transmission manner that can be supported by the MME and the UE.

The MME determines the information transmission manner supported by the MME and the UE, and the MME uses a same route distinguisher to correspond to different information transmission manners, as shown in Table 4:

TABLE 4

| Information transmission manner supported by UE | Information transmission manner supported by an MME | Route distinguisher |
|---|---|---|
| A manner in which transmission of a short message service message is supported | A manner in which transmission of a short message service message is supported | MME ID |
| A manner in which a service interaction functional entity directly performs control plane data transmission from the MME to the UE | A manner in which a service interaction functional entity directly performs control plane data transmission from the MME to the UE | MME ID |
| A manner in which transmission of a short message service message is supported, and a manner in which a service interaction functional entity directly performs control plane data transmission from the MME to the UE | A manner in which transmission of a short message service message is supported, and a manner in which a service interaction functional entity directly performs control plane data transmission from the MME to the UE | MME ID |

Table 4 provides examples of the information transmission manners supported by the UE, the information transmission manners supported by the MME, and the route distinguisher, only for understanding of the present application. The present application includes but is not limited to the examples provided in Table 4.

903: The MME sends a location update request message to an HSS, where the request message carries the information transmission manner that is determined by the MME and that can be supported by both the MME and the UE, and a route distinguisher of the MME that corresponds to the information transmission manner.

904: The HSS saves, to a context of the UE, the route distinguisher corresponding to the information transmission manner that is determined and supported by the MME and the UE.

In this embodiment of the present application, an MTC-IWF acquires a route distinguisher of an MME that corresponds to an information transmission manner supported by the MME, the MTC-IWF routes, according to the route distinguisher of the MME, a data packet that needs to be transmitted, so that the MTC-IWF accurately selects a proper transmission path for the data packet, and performs routing by using a route distinguisher of the MME that corresponds to an information transmission manner that can be supported by both the UE and the MME, so that a success rate of sending a short message service message is further increased, thereby improving service experience of a user.

Figure 10:
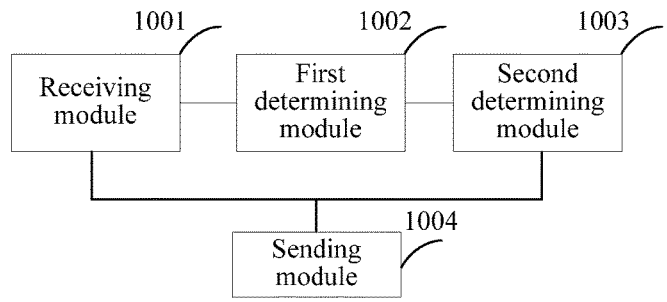
FIG. 10 is a schematic structural diagram of another embodiment of a data routing apparatus according to the present application.

FIG. 10 is a schematic flowchart of an embodiment of a data routing apparatus according to the present application. The embodiment includes:

a receiving module 1001, configured to receive a route distinguisher of an MME serving UE sent by the MME, where the route distinguisher is in a one-to-one correspondence with an information transmission manner supported by the MME;

a first determining module 1002, configured to determine, according to the route distinguisher received by the receiving module, an information transmission manner supported by the MME, where the receiving module is configured to receive a query message sent by an MTC-IWF, where the query message carries a UE identifier and an information transmission manner that needs to be used; and a second determining module 1003, configured to determine, according to the information transmission manner supported by the MME and determined by the first determining module, and the UE identifier and the information transmission manner that needs to be used that are received by the receiving module, that the MME serving the UE supports the information transmission manner that needs to be used; and a sending module 1004, configured to send the route distinguisher of the MME received by the receiving module to the MTC-IWF, so that the MTC-IWF performs routing according to the route distinguisher.

In this embodiment of the present application, an HSS receives a route distinguisher of an MME serving UE sent by the MME, determines, according to the route distinguisher, an information transmission manner supported by the MME, and determines, according to the information transmission manner supported by the MME, the received UE identifier, and the information transmission manner that needs to be used, that the MME supports the information transmission manner that needs to be used, and the HSS sends a route distinguisher of the MME that corresponds to the information transmission manner that needs to be used to an MTC-IWF, so that the MTC-IWF routes, according to the route distinguisher of the MME, a data packet that needs to be transmitted. Therefore, a most effective transmission path is selected for information transmission, thereby improving service experience of a user.

The receiving module is specifically configured to receive all route distinguishers of the MME sent by the MME; or receive a route distinguisher of the MME that corresponds to an information transmission manner supported by both the MME and the UE.

The second determining module is specifically configured to determine, according to the UE identifier received by the receiving module, the MME serving the UE, and query, according to the information transmission manner that needs to be used, the information transmission manner that is supported by the MME and that is determined by the first determining module, to determine that the MME serving the UE supports the information transmission manner that needs to be used.

It should be noted that, the apparatus shown in FIG. 10 can separately implement the methods in the embodiments that are shown in FIG. 1, FIG. 3, FIG. 4, FIG. 6, and FIG. 7 in the foregoing method embodiments. For details, reference may be made to descriptions in the foregoing embodiments.

Figure 11:
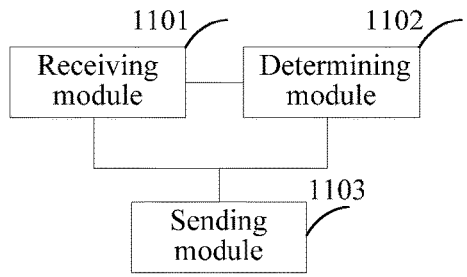
FIG. 11 is a schematic structural diagram of another embodiment of a data routing apparatus according to the present application.

FIG. 11 is a schematic flowchart of another embodiment of a data routing apparatus according to the present application. The embodiment includes:

a receiving module 1101, configured to receive a route distinguisher of a mobile management entity MME serving UE and an information transmission manner supported by the MME that are sent by the MME, where the receiving module is configured to receive a query message sent by an MTC-IWF, where the query message carries a UE identifier and an information transmission manner that needs to be used;

a determining module 1102, configured to determine, according to the information transmission manner supported by the MME, the UE identifier, and the information transmission manner that needs to be used that are received by the receiving module, that the MME supports the information transmission manner that needs to be used; and a sending module 1103, configured to send the route distinguisher of the MME received by the receiving module to the MTC-IWF, so that the MTC-IWF routes, according to the route distinguisher of the MME, a data packet that needs to be transmitted.

In this embodiment of the present application, an HSS receives a route distinguisher of an MME and an information transmission manner supported by the MME that are sent by the MME, and determines, according to the information transmission manner supported by the MME, the received UE identifier, and the information transmission manner that needs to be used, that the MME supports the information transmission manner that needs to be used, and the HSS sends a route distinguisher of the MME that corresponds to the information transmission manner that needs to be used to an MTC-IWF, so that the MTC-IWF routes, according to the route distinguisher of the MME, a data packet that needs to be transmitted. Therefore, a most effective transmission path is selected for information transmission, and a success rate of sending a short message service message is further increased, thereby improving service experience of a user.

The receiving module is specifically configured to:

receive, by the HSS, information about an information transmission manner supported by both the MME and the UE and sent by the MME.

The determining module is specifically configured to determine, according to the UE identifier received by the receiving module, the MME serving the UE, and query, according to the information transmission manner that needs to be used and that is received by the receiving module, the information transmission manner supported by the MME, to determine that the MME serving the UE supports the information transmission manner that needs to be used.

It should be noted that, the apparatus shown in FIG. 11 can separately implement the methods in the embodiments that are shown in FIG. 2, FIG. 3, FIG. 5, FIG. 8, and FIG. 9 in the foregoing method embodiments. For details, reference may be made to descriptions in the foregoing embodiments.

Figure 12:
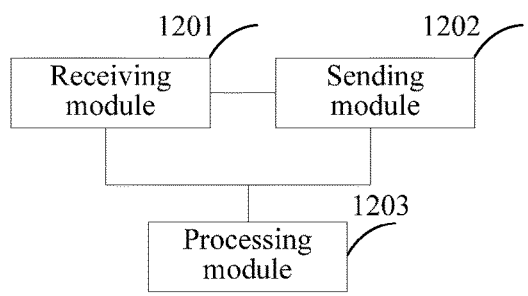
FIG. 12 is a schematic structural diagram of another embodiment of a data routing apparatus according to the present application.

FIG. 12 is a schematic flowchart of another embodiment of a data routing apparatus according to the present application. The embodiment includes:

a receiving module 1201, configured to receive a UE identifier, a data packet that needs to be transmitted, and an information transmission manner that needs to be used that are sent by an application service platform;

a sending module 1202, configured to send a query message to a home subscriber server HSS, where the query message carries the UE identifier and the information transmission manner that needs to be used that are received by the receiving module, so that the HSS determines, according to an information transmission manner supported by an MME, the UE identifier, and the information transmission manner that needs to be used, that the MME supports the information transmission manner that needs to be used, where the receiving module is configured to receive a route distinguisher of the MME sent by the HSS; and a processing module 1203, configured to route the data packet according to the route distinguisher received by the receiving module.

An MTC-IWF receives a UE identifier, a data packet that needs to be transmitted, and an information transmission manner that needs to be used that are sent by an application service platform; sends a query message to a home subscriber server HSS, where the query message carries the UE identifier and the information transmission manner that needs to be used that are received by the receiving module, so that the HSS determines, according to an information transmission manner supported by an MME, the UE identifier, and the information transmission manner that needs to be used, that the MME supports the information transmission manner that needs to be used; receives a route distinguisher of the MME sent by the HSS; and routes the data packet according to the route distinguisher. Therefore, a most effective transmission path is selected for information transmission, thereby improving service experience of a user.

The receiving module is specifically configured to:

receive a route distinguisher of the MME that corresponds to an information transmission manner supported by both the MME and the UE and that is sent by the HSS.

It should be noted that, the apparatus shown in FIG. 12 can separately implement the method shown in any of the foregoing method embodiments. For details, reference may be made to descriptions in the foregoing embodiments.

Figure 13:
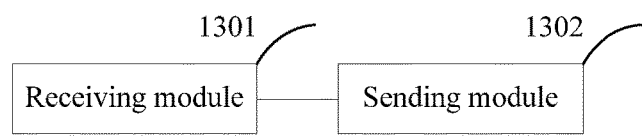
FIG. 13 is a schematic structural diagram of another embodiment of a data routing apparatus according to the present application.

FIG. 13 is a schematic flowchart of another embodiment of a data routing apparatus according to the present application. The embodiment includes:

a receiving module 1301, configured to receive a request for registering with an MME sent by UE; and a sending module 1302, configured to send a route distinguisher of the MME to an HSS, where the route distinguisher of the MME is in a one-to-one correspondence with an information transmission manner supported by the MME, so that the HSS determines, according to the route distinguisher of the MME, the information transmission manner supported by the MME, determines, according to the information transmission manner supported by the MME, and a UE identifier and an information transmission manner that needs to be used that are sent by the MTC-IWF, that the MME supports the information transmission manner that needs to be used, and sends a route distinguisher that corresponds to the information transmission manner that needs to be used to the MTC-IWF, so that the MTC-IWF performs routing according to the route distinguisher.

In this embodiment of the present application, an HSS receives a route distinguisher sent by an MME, determines, according to the route distinguisher, an information transmission manner supported by the MME, and determines, according to the information transmission manner supported by the MME, the received UE identifier, and the information transmission manner that needs to be used, that the MME supports the information transmission manner that needs to be used, and the HSS sends a route distinguisher of the MME that corresponds to the information transmission manner that needs to be used to an MTC-IWF, so that the MTC-IWF routes, according to the route distinguisher of the MME, a data packet that needs to be transmitted. Therefore, a most effective transmission path is selected for information transmission, thereby improving service experience of a user.

The receiving module is specifically configured to receive a request, for registering with the MME, that carries capability information of the UE and that is sent by the UE.

The sending module is specifically configured to send, to the HSS, a route distinguisher that corresponds to an information transmission manner supported by both the MME and the UE.

The receiving module is specifically configured to receive a non-access stratum NAS message sent by the UE; or receive a location update request message sent by the UE; or receive a switching request message sent by the UE.

It should be noted that, the apparatus shown in FIG. 13 can separately implement the methods in the embodiments that are shown in FIG. 1, FIG. 3, FIG. 4, FIG. 6, and FIG. 7 in the foregoing method embodiments. For details, reference may be made to descriptions in the foregoing embodiments.

Figure 14:
FIG. 14 is a schematic structural diagram of another embodiment of a data routing apparatus according to the present application.

FIG. 14 is a schematic flowchart of another embodiment of a data routing apparatus according to the present application. The embodiment includes:

a receiving module 1401, configured to receive a request for registering with an MME sent by UE; and a sending module 1402, configured to send a route distinguisher supported by the MME and an information transmission manner supported by the MME to a home subscriber server HSS, so that the HSS determines, according to the information transmission manner supported by the MME, and a UE identifier and an information transmission manner that needs to be used that are sent by an MTC-IWF, that the MME supports the information transmission manner that needs to be used, and sends the route distinguisher of the MME to the MTC-IWF, so that the MTC-IWF routes, according to the route distinguisher of the MME, a data packet that needs to be transmitted.

In this embodiment of the present application, an MTC-IWF acquires a route distinguisher of the MME, and the MTC-IWF routes, according to the route distinguisher, a data packet that needs to be transmitted. Therefore, the MTC-IWF accurately selects a proper transmission path for the data packet, so that the data packet can arrive at UE in time; and because a same route distinguisher is used, a distinguisher resource of a network node is reduced, thereby improving service experience of a user.

The receiving module is specifically configured to receive an NAS message that carries capability information of the UE and that is sent by the UE.

The sending module is specifically configured to send, to the HSS, a route distinguisher that corresponds to an information transmission manner supported by both the MME and the UE.

It should be noted that, the apparatus shown in FIG. 14 can separately implement the methods in the embodiments that are shown in FIG. 2, FIG. 3, FIG. 5, FIG. 8, and FIG. 9 in the foregoing method embodiments. For details, reference may be made to descriptions in the foregoing embodiments.

Figure 15:
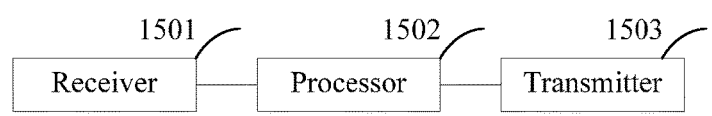
FIG. 15 is a schematic structural diagram of another embodiment of a data routing apparatus according to the present application.

FIG. 15 is a schematic flowchart of an embodiment of a data routing apparatus according to the present application. The embodiment includes:

a receiver 1501, configured to receive a route distinguisher of an MME serving UE sent by the MME;

a processor 1502, configured to determine, according to the route distinguisher received by the receiver, an information transmission manner supported by the MME, where the route distinguisher is in a one-to-one correspondence with the information transmission manner supported by the MME, where the receiver is configured to receive a query message sent by an MTC-IWF, where the query message carries a UE identifier and an information transmission manner that needs to be used; and the processor is configured to determine, according to the information transmission manner supported by the MME, and the UE identifier and the information transmission manner that needs to be used that are received by the receiver, that the MME serving the UE supports the information transmission manner that needs to be used; and a transmitter 1503, configured to send a route distinguisher of the MME that is received by the receiver and that corresponds to the information transmission manner that needs to be used to the MTC-IWF, so that the MTC-IWF performs routing according to the route distinguisher.

The receiver is specifically configured to receive all route distinguishers of the MME sent by the MME; or receive a route distinguisher of the MME that corresponds to an information transmission manner supported by both the MME and the UE.

The processor is specifically configured to determine, according to the UE identifier received by the receiving module, the MME serving the UE, and query, according to the information transmission manner that needs to be used, the information transmission manner that is supported by the MME and that is determined by the first determining module, to determine that the MME serving the UE supports the information transmission manner that needs to be used.

It should be noted that, the apparatus shown in FIG. 15 can separately implement the methods in the embodiments that are shown in FIG. 1, FIG. 3, FIG. 4, FIG. 6, and FIG. 7 in the foregoing method embodiments. For details, reference may be made to descriptions in the foregoing embodiments. For an effect achieved by the apparatus, reference may also be made to the descriptions in the foregoing embodiments.

Figure 16:
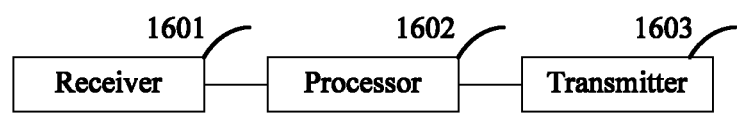
FIG. 16 is a schematic structural diagram of another embodiment of a data routing apparatus according to the present application.

FIG. 16 is a schematic flowchart of another embodiment of a data routing apparatus according to the present application. The embodiment includes:

a receiver 1601, configured to receive a route distinguisher of an MME serving UE and an information transmission manner supported by the MME that are sent by the MME, where the receiver is configured to receive a query message sent by a service interaction functional entity MTC-IWF, where the query message carries a UE identifier and an information transmission manner that needs to be used;

a processor 1602, configured to determine, according to the information transmission manner supported by the MME, the UE identifier, and the information transmission manner that needs to be used that are received by the receiver, that the MME serving the UE supports the information transmission manner that needs to be used; and a transmitter 1603, configured to send the route distinguisher received by the receiver to the MTC-IWF, so that the MTC-IWF routes, according to the route distinguisher, a data packet that needs to be transmitted.

The receiver is specifically configured to:

receive information about an information transmission manner supported by both the MME and the UE and sent by the MME.

The processor is specifically configured to:

determine, according to the UE identifier received by the receiving module, the MME serving the UE, and query, according to the information transmission manner that needs to be used and that is received by the receiving module, the information transmission manner supported by the MME, to determine that the MME serving the UE supports the information transmission manner that needs to be used.

It should be noted that, the apparatus shown in FIG. 16 can separately implement the methods in the embodiments that are shown in FIG. 2, FIG. 3, FIG. 5, FIG. 8, and FIG. 9 in the foregoing method embodiments. For details, reference may be made to descriptions in the foregoing embodiments. For an effect achieved by the apparatus, reference may also be made to the descriptions in the foregoing embodiments.

Figure 17:
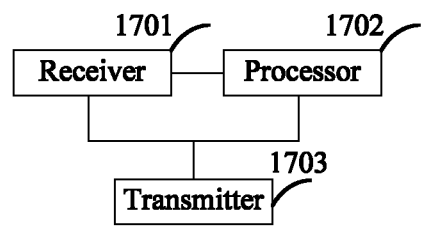
FIG. 17 is a schematic structural diagram of another embodiment of a data routing apparatus according to the present application.

FIG. 17 is a schematic flowchart of another embodiment of a data routing apparatus according to the present application. The embodiment includes:

a receiver 1701, configured to receive a UE identifier, a data packet that needs to be transmitted, and an information transmission manner that needs to be used that are sent by an application service platform;

a transmitter 1702, configured to send a query message to an HSS, where the query message carries the UE identifier and the information transmission manner that needs to be used that are received by the receiver, so that the HSS determines, according to an information transmission manner supported by the MME, the UE identifier, and the information transmission manner that needs to be used, that the MME serving UE supports the information transmission manner that needs to be used, where the receiver is configured to receive a route distinguisher of the MME sent by the HSS; and a processor 1703, configured to route the data packet according to the route distinguisher received by the receiver.

The receiver is specifically configured to:

receive a route distinguisher that corresponds to an information transmission manner supported by both the MME and the UE and that is sent by the HSS.

It should be noted that, the apparatus shown in FIG. 17 can separately implement the method shown in any of the foregoing method embodiments. For details, reference may be made to descriptions in the foregoing embodiments. For an effect achieved by the apparatus, reference may also be made to the descriptions in the foregoing embodiments.

Figure 18:
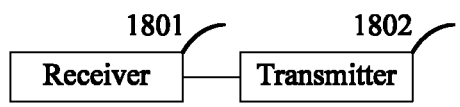
FIG. 18 is a schematic structural diagram of another embodiment of a data routing apparatus according to the present application.

FIG. 18 is a schematic flowchart of another embodiment of a data routing apparatus according to the present application. The embodiment includes:

a receiver 1801, configured to receive a request for registering with an MME sent by UE; and a transmitter 1802, configured to send a route distinguisher of the MME to an HSS, where the route distinguisher is in a one-to-one correspondence with an information transmission manner supported by the MME, so that the HSS determines, according to the route distinguisher, the information transmission manner supported by the MME, determines, according to the information transmission manner supported by the MME, and a UE identifier and an information transmission manner that needs to be used that are sent by the MTC-IWF, that the MME supports the information transmission manner that needs to be used, and sends a route distinguisher of the MME that corresponds to the information transmission manner that needs to be used to the MTC-IWF, so that the MTC-IWF performs routing according to the route distinguisher.

The receiver is specifically configured to receive a request, for registering with the MME, that carries capability information of the UE and that is sent by the UE.

The transmitter is specifically configured to send, to the HSS, a route distinguisher that corresponds to an information transmission manner supported by both the MME and the UE.

The receiver is specifically configured to receive a non-access stratum NAS message sent by the UE; or receive a location update request message sent by the UE; or receive a switching request message sent by the UE.

It should be noted that, the apparatus shown in FIG. 18 can separately implement the methods in the embodiments that are shown in FIG. 1, FIG. 3, FIG. 4, FIG. 6, and FIG. 7 in the foregoing method embodiments. For details, reference may be made to descriptions in the foregoing embodiments. For an effect achieved by the apparatus, reference may also be made to the descriptions in the foregoing embodiments.

Figure 19:
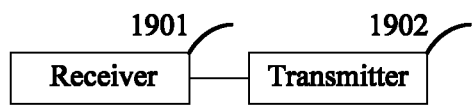
FIG. 19 is a schematic structural diagram of another embodiment of a data routing apparatus according to the present application.

FIG. 19 is a schematic flowchart of another embodiment of a data routing apparatus according to the present application. The embodiment includes:

a receiver 1901, configured to receive a request for registering with an MME sent by UE; and a transmitter 1902, configured to send a route distinguisher supported by the MME and an information transmission manner that can be supported by the MME to a home subscriber server HSS, so that the HSS determines, according to the information transmission manner supported by the MME, and a UE identifier and an information transmission manner that needs to be used that are sent by an MTC-IWF, that the MME supports the information transmission manner that needs to be used, and sends the route distinguisher of the MME to the MTC-IWF, so that the MTC-IWF routes, according to the route distinguisher, a data packet that needs to be transmitted.

The receiver is specifically configured to receive an NAS message that carries capability information of the UE and that is sent by the UE.

The transmitter is specifically configured to send, to the HSS, a route distinguisher that corresponds to an information transmission manner supported by both the MME and the UE.

It should be noted that, the apparatus shown in FIG. 19 can separately implement the methods in the embodiments that are shown in FIG. 2, FIG. 3, FIG. 5, FIG. 8, and FIG. 9 in the foregoing method embodiments. For details, reference may be made to descriptions in the foregoing embodiments. For an effect achieved by the apparatus, reference may also be made to the descriptions in the foregoing embodiments.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A data routing method, comprising:
   receiving, by a home subscriber server (HSS), a route distinguisher of a mobile management entity (MME) serving user equipment (UE) and an information transmission manner supported by the MME that are sent by the MME;
   receiving, by the HSS, a query message, wherein the query message carries a UE identifier and an information transmission manner that needs to be used;
   determining, by the HSS according to the information transmission manner supported by the MME, the UE identifier, and the information transmission manner that needs to be used, that the MME supports the information transmission manner that needs to be used; and
   sending, by the HSS, the route distinguisher of the MME to a data routing apparatus, so that the data routing apparatus routes, according to the route distinguisher, a data packet that needs to be transmitted.

2. The method according to claim 1, wherein information about the information transmission manner sent by the MME and received by the HSS comprises: information about an information transmission manner supported by both the MME and the UE.

3. The method according to claim 1, wherein the determining, by the HSS according to the information transmission manner supported by the MME, the UE identifier, and the information transmission manner that needs to be used, that the MME supports the information transmission manner that needs to be used comprises:
   determining, by the HSS according to the UE identifier, the MME serving the UE; and
   querying, according to the information transmission manner that needs to be used, the information transmission manner supported by the MME, to determine that the MME serving the UE supports the information transmission manner that needs to be used.

4. A home subscriber server (HSS), comprising:
   a receiver, configured to receive a route distinguisher of a mobile management entity (MME) serving user equipment (UE) and an information transmission manner supported by the MME that are sent by the MME, wherein
   the receiver is configured to receive a query message, wherein the query message carries a UE identifier and an information transmission manner that needs to be used;
   a processor, configured to determine, according to the information transmission manner, the UE identifier, and the information transmission manner that needs to be used that are received by the receiver, that the MME serving the UE supports the information transmission manner that needs to be used; and
   a transmitter, configured to send the route distinguisher of the MME received by the receiver to a data routing apparatus, so that the data routing apparatus routes, according to the route distinguisher of the MME, a data packet that needs to be transmitted.

5. The HSS according to claim 4, wherein the receiver is configured to:
   receive information about an information transmission manner supported by both the MME and the UE and sent by the MME.

6. The HSS according to claim 4, wherein the processor is configured to:
   determine, according to the UE identifier received by the receiver, the MME serving the UE, and query, according to the information transmission manner that needs to be used and that is received by the receiver, the information transmission manner supported by the MME, to determine that the MME serving the UE supports the information transmission manner that needs to be used.

\* \* \* \* \*